Sept. 6, 1932.   W. E. HOKE   1,875,872
SCREW THREAD GAUGE
Filed Feb. 21, 1930

INVENTOR
William E. Hoke
BY
ATTORNEYS

Patented Sept. 6, 1932

1,875,872

UNITED STATES PATENT OFFICE

WILLIAM E. HOKE, OF BALTIMORE, MARYLAND, ASSIGNOR TO DARDELET THREADLOCK CORPORATION, OF NEW YORK, N. Y., A CORPORATION OF DELAWARE

SCREW THREAD GAUGE

Application filed February 21, 1930. Serial No. 430,281.

This invention relates to improvements in screw thread gauges, and more particularly to gauges for testing internal screw threads in tapped holes.

The invention has for its general object to provide a simple and efficient gauge for testing internal screw threads as to accuracy of manufacture with respect to their minor diameter or the radial displacement from the thread axis of the crest surface of the rib of the thread. Further objects of the invention are to provide a simple and efficient gauge for quickly and accurately gauging the conoidal crest locking surface of internal screw threads of the well known Dardelet type, and to provide a high precision comparator gauge for determining whether the crest size of internal Dardelet threads falls within a permissible range of plus and minus variation from a standard nominal size.

Figure 1:
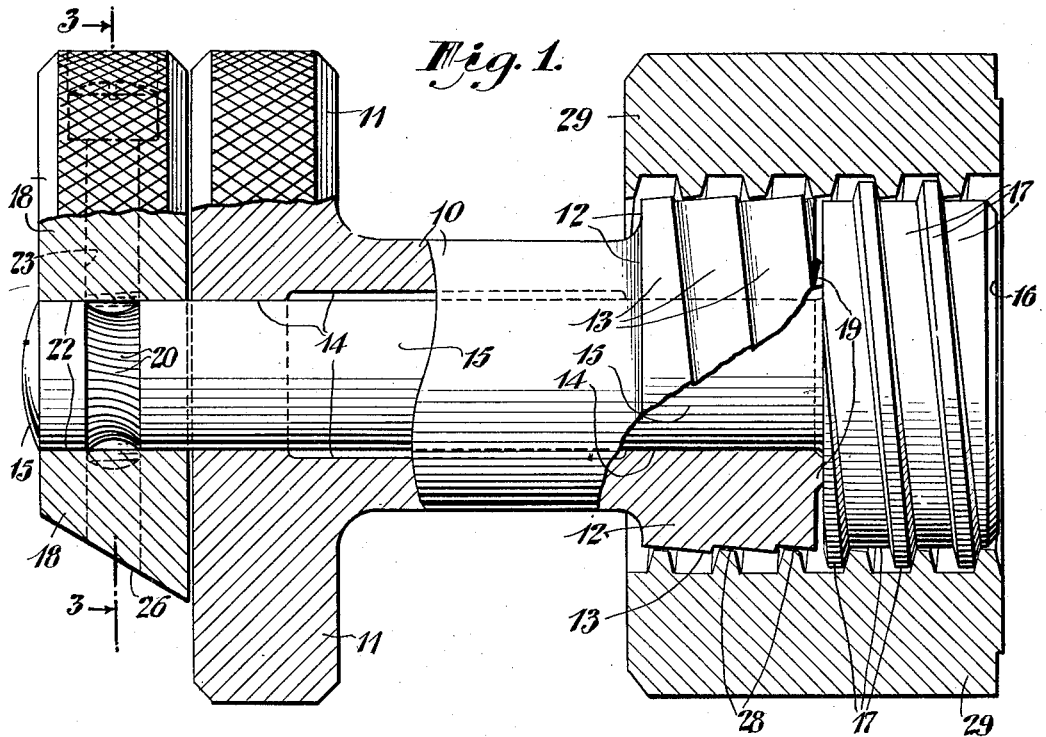
Figure 2:
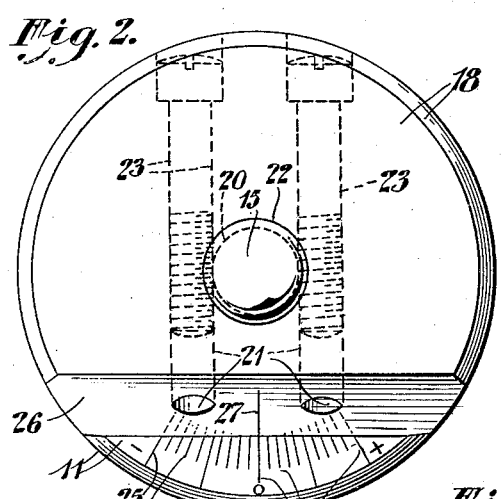
Figure 3:
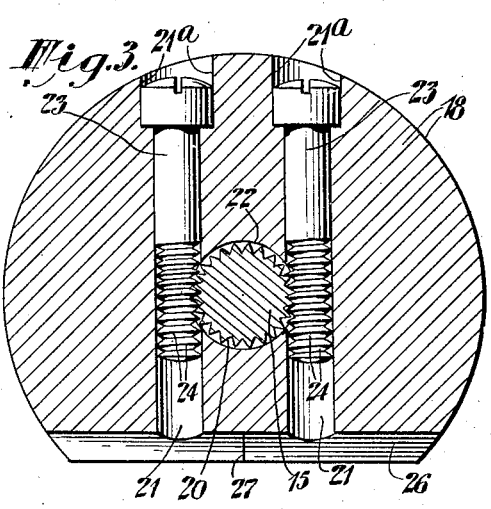
Figure 4:
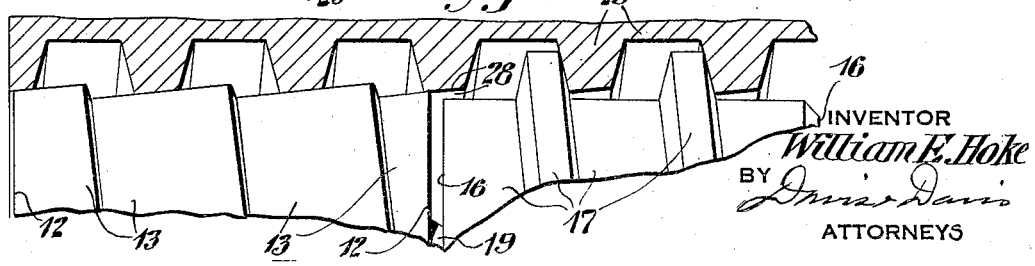

Other objects and advantages of the invention will appear from the following description of the preferred form of gauge illustrated in the accompanying drawing, wherein, Fig. 1 is a view showing the gauge partly in elevation and partly in section, with its nut thread engaging parts adjusted for loosely receiving an acceptable nut thread and for quick and easy spinning thereupon of an acceptable nut, the Dardelet nut shown having a thread whose minor diameter is of the nominal size for threads of the size the gauge is constructed to test;

Fig. 2 is an end view of the handle end of the gauge showing the setting assumed upon counter-clockwise rotation of the adjusting knob as viewed in Fig. 2 from the preliminary setting of Fig. 1 to a position in which the crest surface of a thread of nominal minor diameter seats upon the innermost thread of the gauge as shown in Fig. 4;

Fig. 3 is a detail sectional view on the line 3—3 of Fig. 1 showing the means whereby the adjusting knob is held upon one of the threaded elements of the gauge; and Fig. 4 is a detail view on an enlarged scale showing the threaded parts of the gauge relatively rotatably adjusted with relation to an internal Dardelet thread of nominal size into crest size or minor diameter measuring or determining position.

The gauge comprises a pair of externally threaded elements relatively rotatable about a common axis but restrained from relative axial travel, the thread of one of said elements being the crest size comparator or minor diameter determining thread and the thread of the other element being a displacement effecting thread for bringing the crest of the thread to be tested into contact with the gauging surface of the testing thread, the two elements being rotatably adjustable to place the two threads in a common helix and thereby permit easy and rapid spinning interfitting or screwing of the nut or other internally threaded element upon the threads of both of the threaded elements of the gauge and thereafter being relatively rotatable to cause the displacement effecting thread to coact with one portion of the nut thread to effect a relative axial displacement of another portion of the nut thread into firmly seated engagement with one face of the comparator thread, the last mentioned thread face making a small angle with the axial line of the threads, and in gauges for Dardelet threads preferably making the standard angle of six degrees with the thread axis which is made by the locking crest surface of internal Dardelet threads.

In the preferred construction of gauge shown, the comparator element comprises a cylindrical shank 10 having an enlarged integral knob or hand-grip disk 11 at one end and an enlarged externally threaded portion 12 at its opposite end, the external thread thereon being the comparator thread 13 of the gauge. The comparator element is formed with an axial bore 14 extending therethrough which is preferably enlarged intermediate its ends, as shown, to reduce friction between said element and the cylindrical shaft portion 15 of the displacement effecting element of the gauge.

The displacement effecting element comprises shaft portion 15 extending through and journalled in bore 14, an integral enlarged externally threaded portion 16 at one end of the shaft, the thread on which is the displacement effecting thread 17 of the gauge, and an adjusting knob or hand grip disk 18 detachably and non-rotatably held on the opposite end of the shaft. Disk 18 is attached to that end of the shaft which projects outwardly beyond disk 11, and threaded portion 16 is located at the outer end of threaded portion 12 and loosely abuts said outer end of portion 12 which is preferably provided with an annular boss 19 on its outer face around bore 14 contacting the inner end of portion 16 to reduce friction between the adjacent abutting end faces of the portions 12 and 16.

Disks 11 and 18 preferably have knurled peripheries as indicated in the drawing, and a slight clearance is preferably provided between the adjacent faces of the disks when boss 19 is firmly abutted against the inner end face of portion 16 for the purpose of reducing friction during rotary adjustments between the gauge elements. Disk 18 may be held to shaft 15 against turning and axial movement thereon by any suitable means. For this purpose worm gear teeth 20 are cut in shaft 15 adjacent its outer end, forming a worm toothed groove constituting an integral worm gear portion of shaft 15. A pair of parallel cylindrical bores 21 are provided through disk 18 which at their adjacent sides intermediate their ends intersect an axial bore 22 of the disk in which fits the outer end portion of shaft 15. A pair of worm screws 23 are confined in said bores 21 with their heads countersunk and rotatable in enlarged end portions 21$^a$ of the bores and their threaded shanks freely rotatable in the bores with their worm threads 24 meshing with the worm gear teeth 20 on shaft 15. By this means disk 18 may be accurately rotatively adjusted relatively to shaft 15 and securely locked in desired adjusted relation to said shaft against back-lash, and will also be held against axial movement on the shaft.

Disk 11 is provided on its outer face with an arcuate series of graduations 25, and disk 18 has a segmental portion thereof removed to permit exposure of graduations 25 and afford a plane chord surface 26 preferably inclined to the axis of the disk, as shown, and having an index mark 27 thereon extending radially of the disk to that edge of beveled surface 26 which is adjacent to the graduated face of disk 11. Graduations 25 and index mark 27 coactive therewith may be stamped or printed on the disks or otherwise formed thereon. Graduations 25 form a scale including an intermediate nominal size graduation distinguished in any suitable manner, such as by the "0" character shown, and a series of plus and minus variation extent indicating graduations terminating in plus and minus limit indicating graduations suitably distinguished, as by the "+" and "−" characters shown. The construction of the gauge is such that the graduations 25 may be practicably spaced for easy reading while at the same time the angle of turn required to shift the index mark from one to the other will only vary the setting of the gauge very minutely, so that variations in diametrical thread size of .0001 inch or smaller may be measured by turning disk 18 one scale space.

The threads 13 and 17 are of equal pitch but of different profile, the pitch corresponding with the pitch of the thread to be tested. The measuring or testing thread 13 is of the buttress thread type having one face of its rib much wider than the other and making a small angle with the axial line of the thread. The diameter of the wider conoidal testing face of thread 13 increases in the direction in which the nut or other thread screwed on the gauge threads is displaceable relatively to said surface by the displacement-effecting thread 17, which direction in the construction of gauge shown is toward the outer end of portion 12 and toward portion 16. The diameter of this gauging surface at its higher side is at least as great as, and is preferably greater than, the crest diameter of the largest acceptable nut thread. In gauges for testing Dardelet threads the wider testing face of thread 13 is given the same slope relatively to the thread axis as that of the locking crest surface of the Dardelet internal thread, this angle of slope being six degrees.

The displacement effecting thread 17 is preferably of the same root diameter as thread 13 so that no nut thread may be screwed thereon which will not pass on to thread 13 and this root diameter is made such that it does not exceed, and is preferably less than, the minor diameter of a nut thread having the greatest permissible minus variation from the nominal minor diameter. The major diameter of thread 17 is preferably substantially greater than that of thread 13, and the rib of thread 17 is formed with steep side faces preferably having the same slope as the side faces of the thread to be tested, as shown, and this thread is preferably given a cylindrical root surface and a rib narrower than the nut thread groove and of less height than the depth of the nut thread groove so as to contact with only one side face of the nut thread during gauging adjustment of the gauge elements, as shown in Figs. 1 and 4. The form of the thread 17 in the gauge illustrated is similar to that of the well-known Acme thread except that it has a materially greater width of root surface as compared with the thickness of the rib. The slope of the narrower side face of thread 13 is preferably the same as that of the side faces of the rib of thread 17.

From the foregoing description it will be observed that the two threads are so formed as to especially adapt them to efficiently perform their different respective functions, and that the construction of the gauge is such that there is little friction between the moving parts of the gauge and between the gauge elements and a nut being tested, during a measuring operation. It will also be observed that a nut to be tested may be easily and substantially instantaneously spun into place upon the gauge and similarly spun off, while the gauge is adjusted with index mark 27 registering with or slightly to the left (as viewed in Fig. 2) of the minus limit graduation of scale 25. This is an important and highly desirable feature as it affords a gauge suitable for rapid inspection gauging of nuts as well as a gauge suitable for high precision measurement or testing of nut or other internal threads. It will also be noted that a small angle of turn only is required to vary the setting of the gauge within the usual acceptable limits.

The adjusting screws and worm gear permit the placing of the index mark and scale graduations on the disks before assembly, and accurate calibration of the gauge after assembly of its parts, as is obvious.

A standard Dardelet self-locking nut 29 having a thread of the nominal size for which the gauge is calibrated is shown in Fig. 1 loosely spun upon both threaded portions of the gauge ready for measuring, with the gauge threads in or substantially in a common helix and the index mark 27 at the minus end of scale 25, while in Figs. 2 and 4 are shown, respectively, the gauge reading and the changed relation between the gauge threads and the nut thread incident to rotation of disk 18 counterclockwise as viewed in Fig. 2 until such turning is resisted by firm seating of the conoidal locking crest surface 28 of the nut thread upon the conoidal testing surface of gauge thread 13.

It will be obvious that in the rotation of disk 18 as just described portions 12 and 16 have a relative rotation while abutting end to end so that the rib of thread 17 acts as a helical wedge bearing uniformly on the left hand side face of the nut thread entirely around the axis of the nut to seat the crest surface 28 of the nut thread on the correspondingly sloping helicoidal side face of thread 13 of the gauge in that portion of the nut which extends about portion 12 of the gauge. Portion 12 is preferably made relatively short as compared with the height of the nut, as shown, so that the nut thread may be separately tested in different portions of the nut, if desired. Each of the threaded portions of the gauge preferably has at least one full turn of its thread thereon, as shown.

It will be obvious that the gauge may be employed for testing other threads than Dardelet threads and that the invention is susceptible of embodiment in other constructions than the one specifically shown.

What I claim is:

1. A screw thread gauge for testing the diametrical crest dimensions of internal screw threads, comprising two members connected for relative rotation about a common axis and held against axial travel, said members having external screw threads of different profiles but of equal pitch adapted to receive respectively axially spaced portions of the internal thread to be tested, one of said threads being a non-gauging thread with side faces having the same angular relation to the thread axis as the side faces of the internal thread the gauge is designed to test, and the other thread being a gauging thread having a master side face making a substantially smaller angle with the axial line of the thread than the side faces of the non-gauging thread, the axial line of each of said external threads being coincident with the axis of rotation of said members.

2. A screw thread gauge for testing the diametrical crest dimensions of internal screw threads, comprising two members connected for relative rotation about a common axis and held against axial travel, said members having external screw threads of different profiles but of equal pitch adapted to receive respectively axially spaced portions of the internal thread to be tested, one of said threads having a rib materially narrower than the groove of the thread it is designed to test with side faces having the same angular relation to the thread axis as the side faces of the rib of said internal thread, and the other thread being of the buttress type and having one side face thereof making the same angle with the thread axis as the rib side faces of the other thread and a materially wider diameter gauging side face making a much smaller angle with the thread axis, the thread axes being coincident with the axis of rotation of the members.

3. A screw thread gauge as claimed in claim 2, wherein the minor diameters of the member threads are equal and the major diameter of the thread having the diameter gauging surface is materially smaller than that of the other thread on the other member and the major diameter of the latter thread is materially less than the nominal major diameter of an internal thread of the size the gauge is designed to test.

4. A screw thread gauge as claimed in claim 1, characterized by the fact that one of the threaded members has a hand grip and an axial bore, while the other member has a shaft portion extending through said bore and a hand grip element detachably held on the outer end of said shaft portion at the outer face of said other hand grip, said hand grips and adjacent end faces of the threaded portions of said members coacting to restrain the members from axial travel relatively to each other.

5. A screw thread gauge as claimed in claim 1, characterized by the fact that the members are provided with hand grip portions having graduations coactive for indicating the extent of plus or minus variation, if any, from a predetermined nominal diametrical crest dimension.

6. A screw thread gauge as claimed in claim 1, wherein the members have integral portions extending laterally therefrom in one and the same direction, one of which portions is formed with a hand grip at its outer end and the other of which portions comprises a shaft journalled in an axial bore in the other member and projecting beyond said hand grip, and wherein a hand grip member is detachably locked on the projecting end of said shaft and is coactive with the other hand grip to hold the adjacent ends of the threaded portions of the members in substantially abutting contact, said hand grips being provided with indicia coactive to indicate whether or not a tested thread is within predetermined tolerance limits as to the radial displacement of its crest from the thread axis.

7. A gauge for internal screw threads comprising a member having an external gauging thread having a minor diameter gauging side face making a much smaller angle with the thread axis than the side faces of the thread to be tested, a thread camming means engageable in the groove of an internal thread while said thread is interfitted with said gauging thread, said camming means and member being connected for relative rotary adjustment about the axis of the gauging thread while restrained from travel longitudinally of said axis to seat the crest of an internal thread on said gauging side face of the gauging thread, and minor diameter indicating means associated with said member and camming means to respond to variations in the relatively rotatively adjusted relation of said member and camming means.

8. A screw thread diameter gauge comprising two members connected for relative rotation about a common axis and held against other relative movement, said members having respectively gauging and non-gauging screw threads of equal pitch movable into and out of a common helix by relative rotation of the members and closely juxtaposed at adjoining ends of the threads with the thread axes coincident with the axis of rotation of the members, the gauging thread being a buttress thread the least steep side face of which is the diameter gauging master surface of the gauge, and the non-gauging thread having side faces steeper than said side face of the buttress thread, the relative major and minor diameters of said threads being such that a thread to be gauged may be screwed partly on the gauging thread and partly on the non-gauging thread when the two threads are placed in a common helix and its crest subsequently firmly nested on the master face of the gauging thread by relative rotation of the members.

9. A screw thread diameter gauge comprising two members connected for relative rotation about a common axis and held against other relative movement, said members having respectively gauging and non-gauging screw threads of equal pitch movable into and out of a common helix by relative rotation of the members and closely juxtaposed at adjoining ends of the threads with the thread axes coincident with the axis of rotation of the members, the gauging thread being a buttress thread the least steep side face of which is the diameter gauging master surface of the gauge, and the non-gauging thread having side faces steeper than said side face of the buttress thread, the relative major and minor diameters of said threads being such that a thread to be gauged may be screwed partly on the gauging thread and partly on the non-gauging thread when the two threads are placed in a common helix and its crest subsequently firmly nested on the master face of the gauging thread by relative rotation of the members, and means controlled by relative rotation of the members visually indicating any variation in gauged threads from a predetermined nominal crest diameter.

10. A minor diameter gauge for internal screw threads, comprising a member having an external master buttress thread between the major and minor diameters of which are included all acceptable minor diameters of threads the gauge is designed to test, the least steep side face of said master buttress thread being the diameter testing face and making a much smaller angle with the thread axis than the side faces of threads the gauge is designed to test, and a second member having an external thread of the same pitch as the buttress thread and side faces steeper than said testing face of the buttress thread, the external thread of the second member having a greater major diameter than the buttress thread and a minor diameter not exceeding the smallest acceptable minor diameter of threads the gauge is designed to test, said members being connected for relative rotary movement about an axis with which the thread axes are coincident and being held against movement longitudinally of said axis with their threads closely juxtaposed for displacement into and out of a common helix while both threads are engaged with a thread to be tested.

11. A minor diameter testing gauge for internal screw threads of the Dardelet type, comprising a testing member having a master buttress thread between the major and minor diameters of which are included all acceptable minor diameters of Dardelet threads the gauge is designed to test and having a pitch corresponding with that of threads to be tested, the least steep face of said buttress thread being the testing face thereof, setting means connected with said member to engage in the groove of a thread to be gauged when the latter is screwed on the master buttress thread and to rotate about an axis coincident with that of the master buttress thread between positions in which a thread to be gauged is respectively held with its crest firmly nested on the least steep face of the master thread and is freely screwable on and off the gauge, and indicating means associated with the testing member and setting means to respond to variations in the relatively rotatively adjusted relation of the testing member and setting means for indicating whether a thread held nested on the least steep face of the master thread by the setting means is of acceptable minor diameter.

In testimony whereof I hereunto affix my signature.

WILLIAM E. HOKE.